(12) United States Patent
Tanaka et al.

(10) Patent No.: US 7,922,938 B2
(45) Date of Patent: Apr. 12, 2011

(54) FINE SILVER PARTICLE COLLOIDAL DISPERSION, COATING LIQUID FOR SILVER FILM FORMATION, PROCESSES FOR PRODUCING THESE, AND SILVER FILM

(75) Inventors: Hiroyuki Tanaka, Chiba (JP); Kenji Kato, Chiba (JP); Masaya Yukinobu, Chiba (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 228 days.

(21) Appl. No.: 12/085,185

(22) PCT Filed: Dec. 8, 2005

(86) PCT No.: PCT/JP2005/022987
§ 371 (c)(1), (2), (4) Date: May 16, 2008

(87) PCT Pub. No.: WO2007/066416
PCT Pub. Date: Jun. 14, 2007

(65) Prior Publication Data
US 2009/0256118 A1 Oct. 15, 2009

(51) Int. Cl.
*H01B 1/22* (2006.01)
*C09D 1/00* (2006.01)
(52) U.S. Cl. ................................. 252/514; 106/286.7
(58) Field of Classification Search .................. 252/514; 106/286.7
See application file for complete search history.

(56) References Cited

U.S. PATENT DOCUMENTS

2005/0056118 A1* 3/2005 Xia et al. ............... 75/330
2006/0264518 A1* 11/2006 Kato et al. ............. 516/33

FOREIGN PATENT DOCUMENTS

| JP | 4-321628 | 11/1992 |
| JP | 4-333504 | 11/1992 |
| JP | 10-265812 | 10/1998 |
| JP | 11-329071 | 11/1999 |
| JP | 2000-268639 | 9/2000 |
| JP | 2002-180110 | 6/2002 |
| JP | 2002-334618 | 11/2002 |
| JP | 2004-18891 | 1/2004 |
| JP | 2004-68072 | 3/2004 |
| JP | 2004-256915 | 9/2004 |
| WO | WO 2004/096470 A1 | 11/2004 |

OTHER PUBLICATIONS

Frens et al., "Carey Lea's Colloidal Silver," Colloid and Polymer Science, vol. 233, Nos. 1-2 / Aug. 1969 pp. 922-929.*

* cited by examiner

*Primary Examiner* — Mark Kopec
*Assistant Examiner* — Jaison P Thomas
(74) *Attorney, Agent, or Firm* — Kratz, Quintos & Hanson, LLP

(57) ABSTRACT

A process for producing a fine silver particle colloidal dispersion the fine silver particles of which have a larger average particle diameter than those in the conventional Carey-Lea process and also which has superior dispersion stability. An aqueous silver nitrate solution is allowed to react with a mixed solution of an aqueous iron(II) sulfate solution and an aqueous sodium citrate solution, and the resultant reaction fluid containing an agglomerate of fine silver particles is left at 0 to 100° C. to obtain an agglomerate of fine silver particles having grown into granular particles. Next, this agglomerate of fine silver particles having grown into granular particles is filtered, and, to the resultant cake of the agglomerate of fine silver particles, pure water is added to obtain a fine silver particle colloidal dispersion having an average particle diameter of 20 to 200 nm. This fine silver particle colloidal dispersion is concentrated and washed, further followed by addition of an organic solvent containing dimethyl sulfoxide, to obtain a coating liquid for silver film formation.

5 Claims, No Drawings

FINE SILVER PARTICLE COLLOIDAL DISPERSION, COATING LIQUID FOR SILVER FILM FORMATION, PROCESSES FOR PRODUCING THESE, AND SILVER FILM

TECHNICAL FIELD

This invention relates to a fine silver particle colloidal dispersion used to produce, e.g., a coating liquid for silver film formation, for forming silver films on substrates. More particularly, this invention relates to a fine silver particle colloidal dispersion having a large particle diameter, a coating liquid for silver film formation produced by using such a fine silver particle colloidal dispersion, processes for producing these fine silver particle colloidal dispersion and coating liquid for silver film formation, and a silver film obtained by using the coating liquid for silver film formation.

BACKGROUND ART

Colloidal dispersions in which fine particles of a noble metal including silver have been dispersed in a solvent are conventionally used as a coating liquid for transparent electro-conductive layer formation used to prevent electromagnetic waves from leaking in computer displays (Japanese Patent Applications Laid-open No. H11-329071 and No. 2000-268639), a coating liquid for forming antimicrobial coatings (Japanese Patent Application Laid-open No. H4-321628), and so forth. For example, in the former use, a front glass panel of a cathode ray tube (CRT) is coated with the transparent electro-conductive layer forming coating fluid by spin coating or the like, followed by drying and thereafter baking at a temperature of about 200° C. to form a transparent electro-conductive layer.

A method is also proposed in which a highly concentrated fine silver particle colloidal dispersion (a paste) is applied by printing such as screen printing, followed by baking at a temperature of about 200° C. to obtain an electro-conductive silver layer (Japanese Patent Application Laid-open No. 2002-334618). However, the fine silver particle colloidal dispersion used for this purpose has ever been produced by an evaporation-in-gas method in which silver is evaporated and condensed in a gas under reduced pressure to collect the silver in a solution containing a dispersing agent. Hence, this method affords a very poor productivity, and therefore the fine silver particle colloidal dispersion thus obtained has been very expensive. Moreover, in the case of this fine silver particle colloidal dispersion, a dispersing agent capable of combining strongly with the surfaces of fine silver particles is contained in order to improve dispersion stability, and hence it is necessary to decompose and remove the dispersing agent by high-temperature heat treatment at about 200° C. after coating or printing and drying. This can not be said to be preferable.

Meanwhile, the Carey-Lea process (Am. J. Sci., 37, 38, 47, 1889) is available as a process by which a fine silver particle colloidal dispersion containing no dispersing agent can more simply be produced. In this Carey-Lea process, an aqueous silver nitrate solution is mixed in a mixed solution of an aqueous iron(II) sulfate solution and an aqueous sodium citrate solution to allow them to react, the resultant agglomerate of fine silver particles is filtered and washed, and thereafter pure water is added to the resultant cake, whereby a relatively highly concentrated fine silver particle colloidal dispersion can be obtained (Ag: 0.1 to 10% by weight). In regard to one process for obtaining coating liquid for silver film formations by using this silver particle colloidal dispersion, the present inventors have already made a proposal in PCT/JP2004/006053.

Fine silver particles obtained by the above Carey-Lea process are very fine nano-scale colloidal particles of 2 to 15 nm in particle diameter. In addition, in the course of actual production, where a commonly prevailing batch system is used, solutions tends to stand non-uniformly mixed when an aqueous solution of one raw material is put at a stretch into a container holding therein an aqueous solution of the other raw material, making it difficult to control particle diameters of the fine silver particles to be formed. Hence, coarse particles tend to come about in part. For example, coarse particles of about 30 nm in particle diameter may mix in silver particles of usually about 5 to 15 nm in particle diameter. This is remarkable especially when solutions are treated in a large quantity.

Accordingly, in order to make the aqueous raw material solutions mix and react uniformly with each other in the course of production to obtain a fine silver particle colloidal dispersion having a narrow particle size distribution, methods are recently proposed which are a method in which fine silver particles are continuously formed by means of a static mixer or the like while keeping constant the state of mixing and reaction of the aqueous raw material solutions (Japanese Patent Application Laid-open No. 2004-18891) and a method in which aqueous raw material solutions are respectively ejected from different nozzles to mix them (Japanese Patent Application Laid-open No. 2004-68072).

According to these methods, fine silver particle colloidal dispersions respectively having a narrow particle size distribution can be obtained, within the range of, e.g., 2 to 7 nm in an attempt to form particles with small particle diameter and within the range of, e.g., 10 to 15 nm in an attempt to form particles with large particle diameter. However, in these conventional methods making use of the Carey-Lea process, it has been unable to obtain a fine silver particle colloidal dispersion containing fine silver particles of more than 20 nm in average particle diameter however reaction conditions therefor are changed.

Thus, in the conventional methods making use of the Carey-Lea process, it has been unable to obtain any fine silver particle colloidal dispersion containing uniform fine silver particles of more than 20 nm in average particle diameter, and, accordingly, likewise in the coating liquid for silver film formation to be obtained from such a fine silver particle colloidal dispersion, no coating liquid has been obtained which contains uniform fine silver particles of more than 20 nm in average particle diameter.

Now, recently, where electro-conductive silver films are formed, it is desired to form them in a large layer thickness to make the films have a low electrical resistance. However, where coating liquids for silver film formation are used which contain conventional fine silver particles having a small average particle diameter, there has been a problem that cracks may occur at the time of film baking if films are made to have a large layer thickness of up to, e.g., several micrometers (μm), to cause a great deterioration of electro-conductivity and adhesion of the films.

To overcome this problem, it is necessary to keep the films from shrinking at the time of baking, stated specifically, it is necessary for the fine silver particles to have an average particle diameter of at least about 20 nm, or more. However, in the conventional Carey-Lea process, as stated above, it has been difficult to obtain the fine silver particle colloidal dispersion containing fine silver particles of more than 20 nm in average particle diameter. Accordingly, it has also been difficult to obtain at a low cost and in a simple way the coating liquid for silver film formation in which the fine silver particles of more than 20 nm in average particle diameter stand dispersed.

DISCLOSURE OF THE INVENTION

The present invention has been made taking account of such circumstances in conventional cases. Accordingly, an object of the present invention is to provide a fine silver particle colloidal dispersion the fine silver particles of which have a larger average particle diameter than those of any fine silver particle colloidal dispersions obtained by the conventional Carey-Lea process and also which is very inexpensive and has superior dispersion stability, a coating liquid for silver film formation produced by using such a fine silver particle colloidal dispersion, processes for producing these fine silver particle colloidal dispersion and coating liquid for silver film formation, and a silver film obtained by using the coating liquid for silver film formation.

That is, the process for producing a fine silver particle colloidal dispersion according to the present invention is characterized by having:

a reaction step of allowing an aqueous silver nitrate solution to react with a mixed solution of an aqueous iron(II) sulfate solution and an aqueous sodium citrate solution to form an agglomerate of fine silver particles;

a ripening step of leaving the resultant reaction fluid containing the agglomerate of fine silver particles, to obtain an agglomerate of fine silver particles having grown into granular particles;

a filtration step of filtering the agglomerate of fine silver particles having grown into granular particles, to obtain a cake of the agglomerate of fine silver particles; and a dispersion step of adding pure water to the cake to obtain the fine silver particle colloidal dispersion.

The fine silver particle colloidal dispersion according to the present invention is a fine silver particle colloidal dispersion produced by the above process for producing a fine silver particle colloidal dispersion, and is characterized in that the fine silver particles have an average particle diameter of from 20 nm to 200 nm.

Then, the process for producing a coating liquid for silver film formation according to the present invention is characterized by having:

a concentration and washing step of concentrating and washing the fine silver particle colloidal dispersion to obtain a concentrated and washed fine silver particle colloidal dispersion; and a solvent mixing step of adding an organic solvent to the concentrated and washed fine silver particle colloidal dispersion.

The coating liquid for silver film formation according to the present invention is a coating liquid for silver film formation produced by the above process for producing a coating liquid for silver film formation, and is characterized in that the fine silver particles have an average particle diameter of from 20 nm to 200 nm.

The silver film according to the present invention is characterized by being formed by using the above coating liquid for silver film formation.

According to the present invention, it can provide a fine silver particle colloidal dispersion containing fine silver particles having an average particle diameter of as large as from 20 to 200 nm and a narrow particle size distribution and having superior dispersion stability, compared with any conventional fine silver particle colloidal dispersions, by a simple process making use of the Carey-Lea process, and provide a coating liquid for silver film formation which is produced by using this fine silver particle colloidal dispersion.

As for the fine silver particles in the coating liquid for silver film formation of the present invention, the fine silver particles contained therein have an average particle diameter of as large as from 20 to 200 nm, and hence the range of layer thickness within which films can be formed by coating or printing making use of the coating liquid for silver film formation can be made broader to enable control of film resistance values and so forth by controlling layer thickness, baking temperature and so forth. This enables expansion of use into a wide range of uses as silver films. For example, as to electro-conductive silver films obtained by coating or printing using bar coating or screen printing, respectively, followed by baking, the films can be kept from shrinking at the time of baking to prevent occurrence of any cracks, and enables achievement of the desire for larger layer thickness. In addition, as to the silver films, they can also be applied to antimicrobial silver films, visible light reflective films, metallic-gloss printed films and so forth for which any electro-conductivity is not required.

BEST MODES FOR PRACTICING THE INVENTION

The present invention is described below in detail.

In the process of the present invention, first, in a reaction step, a reaction fluid containing an agglomerate of fine silver particles with a small particle diameter in a relatively high concentration is obtained by the known Carey-Lea process (see Am. J. Sci., 37, 38, 47, 1889, and Am. J. Sci., 38, 1889). More specifically, an aqueous silver nitrate solution is mixed in a mixed solution of an aqueous iron(II) sulfate solution and an aqueous sodium citrate solution to allow them to react to form fine silver particles. The reaction of forming the fine silver particles is represented by the following chemical reaction scheme (1).

$$Ag^+ + Fe^{2+} \rightarrow Ag + Fe^{3+} \tag{1}$$

A series of reactions including what is represented by the above chemical reaction scheme (1) takes place in 1 second to 2 seconds after the various aqueous raw material solutions have been mixed. The fine silver particles thus formed undergo the action of protection by citrate ions present together, and at the same time agglomerate rapidly on account of iron ions, sodium ions and so forth present in a high concentration. Hence, they come to form an agglomerate of fine silver particles protected by citrate ions. The fine silver particles formed here are about 2 to 15 nm in particle diameter as being usual.

As a method of mixing the aqueous silver nitrate solution in the mixed solution of an aqueous iron(II) sulfate solution and an aqueous sodium citrate solution, it may be of a batch system or a continuous system. For example, fine silver particles may continuously be formed by means of a static mixer (a mixing equipment having no mechanical movement) while keeping constant the state of mixing and reaction.

Next, in a ripening step, the reaction fluid containing an agglomerate of fine silver particles obtained in the above reaction step are left (allowed to stand). As a result of this leaving, i.e., ripening, an agglomerate of fine silver particles having grown into large granular particles is obtained, and, when finally the fine silver particle colloidal dispersion is made up, the fine silver particles contained therein can have an average particle diameter of 20 nm or more. If the fine silver particles have an average particle diameter of more than 200 nm, they may come to sediment, undesirably. In this ripening step, the reaction fluid may preferably be left as it is. Instead, in the case of, e.g., a reaction fluid formed continuously, it may be left after it has been put into a container.

As conditions under which the reaction fluid containing an agglomerate of fine silver particles are left, i.e., conditions for ripening (particle growth) of the fine silver particles, leaving temperature (the temperature at which the reaction fluid is left) may preferably be from 0° C. to 100° C., and more preferably from 40° C. to 100° C. Leaving time (the time for which the reaction fluid is left) depends on the leaving temperature, and may be within the range of from several minutes to several months, and preferably from tens of minutes to several days. The average particle diameter of the fine silver particles depends on how to set the leaving temperature and the leaving time. The higher the leaving temperature is, or the longer the leaving time is, the larger average particle diameter the fine silver particles comes to have. In particular, fine silver particles having an average particle diameter of more than 30 nm can be obtained in a leaving time of 24 hours or less by setting the leaving temperature at 40° C., to 100° C. Hence, this is particularly preferable in view of production efficiency. The average particle diameter of the fine silver particles may also be controlled by changing ionic levels in the reaction fluid by removing supernatant liquids thereof or adding a citrate thereto.

The reason why the fine silver particles undergo particle growth by leaving the reaction fluid containing the agglomerate of fine silver particles is unclear. It is presumed to be due to the presence of excessive citrate or the like ions in the reaction fluid. For example, in a fine silver particle colloidal dispersion prepared by filtering the reaction fluid having not been subjected to the ripening, to obtain a cake of the agglomerate of fine silver particles, followed by addition of pure water to re-disperse the fine silver particles in the pure water, any fine silver particles having grown uniformly into granular particles can not be obtained however it is left to effect ripening. In such a case, some particular fine silver particles begin to grow, where a phenomenon occurs in which only such fine silver particles grow and the other fine silver particles become smaller little by little (i.e., the Ostwald growth), and hence it comes about that coarse silver particles in the form of hexagonal or triangular plates are formed mixedly with fine silver particles of 2 to 15 nm in particle diameter, so that the fine silver particles can not be made to grow uniformly.

The agglomerate of fine silver particles which has been grown into granular particles in the above ripening step is filtered in the next filtration step, and made into a cake of the agglomerate of fine silver particles. The agglomerate of fine silver particles may be filtered using a conventional method such as membrane filter filtration, centrifugation or filter pressing. In this filtration step, the cake may also be washed with pure water in a quantity small enough not for the fine silver particles to be washed out.

Thereafter, in a dispersion step, pure water is added to the cake of the agglomerate of fine silver particles, thus a fine silver particle colloidal dispersion is obtained. The addition of pure water to the cake of the agglomerate of fine silver particles greatly lowers the concentration of iron ions and sodium ions in the liquid, and hence there comes to be no agglomeration factor, so that the fine silver particles protected by citrate ions come re-dispersed in the liquid, thus the fine silver particle colloidal dispersion is formed. Such a process for producing colloids is commonly called "wash-out process".

The fine silver particle colloidal dispersion obtained by the production process of the present invention as described above contains fine silver particles having a larger average particle diameter than conventional ones, preferably an average particle diameter of from 20 nm to 200 nm, and more preferably of from more than 30 nm to 100 nm or less. In addition, it can be produced by a simple process and inexpensively, and moreover contains less impurities such as a dispersing agent and has superior dispersion stability. The particle diameter herein referred to is the particle diameter of fine silver particles observed on a transmission electron microscope (TEM).

How to produce the coating liquid for silver film formation of the present invention by using the fine silver particle colloidal dispersion described above is described next. First, the fine silver particle colloidal dispersion (fine silver particle concentration: 0.1 to 10% by weight) is concentrated and washed in a concentration and washing step to thereby make up a concentrated and washed fine silver particle colloidal dispersion in which the fine silver particles have been dispersed in the water solvent in a high concentration. The fine silver particle colloidal dispersion may be concentration-treated by a conventional method such as reduced-pressure evaporation or ultrafiltration. It may be washing-treated by a conventional method such as dialysis, electrodialysis, ion exchange or ultrafiltration. In particular, ultrafiltration is a preferable method because the concentration treatment and the washing treatment can simultaneously be carried out.

In the concentrated and washed fine silver particle colloidal dispersion thus obtained, the washing treatment has lowered the concentration of electrolyte in the solvent, and hence this colloidal dispersion is improved in its dispersion stability for the fine silver particles. This dispersion stability is improved because, although colloids may commonly agglomerate in the presence of an electrolyte where the electrolyte is in a high concentration, their agglomeration is hindered where the electrolyte is in a low concentration. In order to enhance the dispersion stability for fine silver particles to a practical level, the concentration of electrolyte may preferably be lowered in the concentration and washing step until the concentrated and washed fine silver particle colloidal dispersion comes to have an electro-conductivity of 500 µS(siemens)/cm or less, preferably 200 µS(siemens)/cm or less, at the solvent part that is exclusive of the fine silver particles from this colloidal dispersion.

The concentrated and washed fine silver particle colloidal dispersion may be applied by printing or coating as it is. Since, however, the solvent is of a water system, this may cause coating defects such as cissing in the step of film formation, depending on the types of substrates such as plastic. Accordingly, an organic solvent is added to the concentrated and washed fine silver particle colloidal dispersion in the next solvent mixing step to make up the coating liquid for silver film formation of the present invention. The coating performance of this coating liquid for silver film formation is vastly improved by the addition of the organic solvent.

The improvement in fine silver particle dispersion stability in virtue of a lowering of the concentration of electrolyte comes alike also in the coating liquid for silver film formation having been mixed with the organic solvent. Accordingly, in a solvent mixing step of adding an organic solvent to the concentrated and washed fine silver particle colloidal dispersion to obtain a coating liquid for silver film formation, for example a washing step of further adding an ion-exchanged resin may be added to lower the concentration of electrolyte.

As the organic solvent, it is preferable to use an organic solvent containing at least dimethyl sulfoxide. This is because the dimethyl sulfoxide (DMSO) acts on the fine silver particles to have the effect of improving the stability of fine silver particles in the coating liquid for silver film formation. The dimethyl sulfoxide may be mixed in an amount of from 0.5 to 300 parts by weight, and preferably from 2 to 50 parts by weight, based on 100 parts by weight of the fine silver particles. If the dimethyl sulfoxide is mixed in an amount of less than 0.5 part by weight, the effect to be brought by the addition of the dimethyl sulfoxide is not seen. If it is in an amount of more than 300 parts by weight, any further improvement of the stability of fine silver particles is not seen, only resulting in a long drying time after printing or coating.

The organic solvent(s) other than the dimethyl sulfoxide may appropriately be selected taking account of the compatibility with the concentrated and washed fine silver particle colloidal dispersion, the solubility against substrates, and the film forming conditions. For example, it may include, but is not limited to, alcohol type solvents such as methanol (MA), ethanol (EA), 1-propanol (NPA), isopropanol (IPA), butanol, pentanol, benzyl alcohol and diacetone alcohol (DAA); ketone type solvents such as acetone, methyl ethyl ketone (MEK), methyl propyl ketone, methyl isobutyl ketone (MIBK), cyclohexanone and isophorone; glycol derivatives such as ethylene glycol monomethyl ether (MCS), ethylene glycol monoethyl ether (ECS), ethylene glycol isopropyl ether (IPC), propylene glycol methyl ether (PGM), propylene glycol ethyl ether (PE), propylene glycol methyl ether acetate (PGM-AC), propylene glycol ethyl ether acetate (PE-AC), diethylene glycol monomethyl ether, diethylene glycol monoethyl ether, diethylene glycol monobutyl ether, diethylene glycol monomethyl ether acetate, diethylene glycol monoethyl ether acetate, diethylene glycol monobutyl ether acetate, diethylene glycol dimethyl ether, diethylene glycol diethyl ether, diethylene glycol dibutyl ether, dipropylene glycol monomethyl ether, dipropylene glycol monoethyl ether and dipropylene glycol monobutyl ether; and benzene derivatives such as toluene, xylene, mesitylene and dodecylbenzene; and formamide (FA), N-methylformamide, dimethylformamide (DMF), dimethylacetamide, N-methyl-2-pyrrolidone (NMP), ethylene glycol, diethylene glycol, tetrahydrofuran (THF), and chloroform.

In the coating liquid for silver film formation obtained through the above concentration and washing step and solvent mixing step, its fine silver particles may preferably be in a concentration ranging from 10 to 70% by weight, and more preferably ranging from 15 to 60% by weight. If the fine silver particles are in a concentration of less than 10% by weight, it is difficult to obtain films with a sufficient thickness by printing carried out once, but films with a sufficient thickness can be formed as long as the fine silver particles are in a concentration of 10% by weight or more. In particular, as long as they are in a concentration of 15% by weight or more, electro-conductive silver films having a low resistance can stably be formed by printing. If on the other hand the fine silver particles are in a concentration of more than 70% by weight, the dispersion stability for fine silver particles in the coating liquid for silver film formation may come poor to tend to make the fine silver particles to agglomerate, undesirably.

The coating liquid for silver film formation of the present invention, thus obtained, contains fine silver particles of 20 nm or more in average particle diameter which stand dispersed in water and an organic solvent, containing the fine silver particles in a concentration high enough to be applicable in printing, contains impurities only in a small quantity, and has superior dispersion stability. In addition, this coating liquid for silver film formation not only has superior dispersion stability, but also can keep films from shrinking at the time of baking even when the films are formed in a large thickness, and enables prevention of occurrence of any cracks. Hence, a silver film can be formed which is, e.g., several micrometers (μm) in thickness and has superior electro-conductivity.

The fine silver particles in the coating liquid for silver film formation may preferably have average particle diameter in the range of from 20 nm to 200 nm, and more preferably from more than 30 nm to 100 nm or less. If the fine silver particles in the coating liquid for silver film formation have an average particle diameter of less than 20 nm, cracks can not be kept from occurring in silver films of several micrometers (μm) or more in thickness. If on the other hand the fine silver particles have an average particle diameter of more than 200 nm, the fine silver particles tends to sediment in the coating liquid for silver film formation, and further the sintering of fine silver particles one another may advance with difficulty in the heat treatment carried out after the coating liquid for silver film formation has been applied by printing and then dried.

Hence, it is difficult to obtain electro-conductive films having a low resistance. The fine silver particles in the coating liquid for silver film formation may also preferably have a good uniformity, where it is preferable that fine silver particles having an average particle diameter of ±20 nm hold 90% or more of the whole.

To form the silver film by using the coating liquid for silver film formation, it may simply be formed by coating. More specifically, the silver film may be formed by coating a substrate with the coating liquid for silver film formation, followed by heat treatment at a temperature of usually from 60 to 250° C. or higher than that, of hundreds of degrees centigrade (° C.) to dry the coating liquid and sinter the fine silver particles one another, thus the silver film can be formed. The coating liquid for silver film formation of the present invention makes a low-resistance electro-conductive silver film obtainable even by heat treatment at about 60° C. unless any additive component such as a binder is added. The heating temperature may be determined taking account of the heat resistance of the substrate to be used, and is not particularly limited.

The substrate on which the coating liquid for silver film formation is to be applied may appropriately be selected according to use purposes. For example, usable are films or sheets made of plastics such as polymethyl methacrylate (PMMA), polycarbonate (PC), polyethylene terephthalate (PET), polyethylene naphthalate (PEN), polyether sulfone (PES) and polyimide (PI), or glass sheets. As a method by which the coating liquid for silver film formation is applied on the substrate by printing or coating, various methods may be used, such as screen printing, gravure coating, ink-jet printing, wire bar coating, doctor blade coating, roll coating and spin coating.

The present invention is specifically described below by giving Examples. The present invention is by no means limited to these Examples. In the following, "%" refers to "% by weight", and "part(s)" refers to "part(s) by weight".

EXAMPLE 1

In a mixed solution of 208 g of an aqueous 23.1% iron sulfate ($FeSO_4.7H_2O$) solution and 256 g of an aqueous 37.5% sodium citrate [$C_3H_4(OH)(COONa)_3.2H_2O$] solution, 176 g of an aqueous 9.1% silver nitrate ($AgNO_3$) solution was mixed to allow them to react to obtain a reaction fluid containing an agglomerate of fine silver particles. Here, the mixed solution of an aqueous iron sulfate solution and an aqueous sodium citrate solution and the aqueous silver nitrate solution were set at liquid temperatures of 20° C. and 10° C., respectively.

In the state the reaction fluid was put in a container, this was left for 6 months in a refrigerator kept at 5° C. From the reaction fluid subjected to this ripening step, the agglomerate of fine silver particles was filtered out by means of a centrifugal separator to obtain a cake of the agglomerate of fine silver particles. Then, pure water was added to this cake to carry out washing-out to obtain 1,050 g of a fine silver particle colloidal dispersion (Ag: 0.94%).

The fine silver particles in the fine silver particle colloidal dispersion obtained had an average particle diameter of 60 nm and had such a uniform particle size distribution that granular fine silver particles of 40 to 80 nm in particle diameter held 90% or more of the whole. Here, the particle diameter of the fine silver particles was measured by observing the fine silver particle colloidal dispersion on a transmission electron microscope (TEM).

EXAMPLE 2

A reaction fluid containing an agglomerate of fine silver particles was obtained in the same way as Example 1. In the state the reaction fluid was put in a container, this was left for 16 hours in an incubator kept at 65° C. From the reaction fluid subjected to this ripening step, the agglomerate of fine silver particles was filtered out by means of a centrifugal separator. To the resultant cake of the agglomerate of fine silver particles, pure water was added to carry out washing-out to obtain 1,050 g of a fine silver particle colloidal dispersion (Ag: 0.96%).

The fine silver particles in the fine silver particle colloidal dispersion obtained had an average particle diameter of 50 nm and had such a uniform particle size distribution that granular fine silver particles of 35 to 65 nm in particle diameter held 90% or more of the whole.

EXAMPLE 3

The fine silver particle colloidal dispersion (Ag: 0.96%) obtained in Example 2 was concentrated and washed both by ultrafiltration to obtain a concentrated and washed fine silver particle colloidal dispersion (Ag: 65%; the balance:water). The water serving as a solvent in this concentrated and washed fine silver particle colloidal dispersion had an electro-conductivity of 200 µS/cm as the value found by measuring that of the filtrate of the ultrafiltration.

To the concentrated and washed fine silver particle colloidal dispersion, dimethyl sulfoxide (DMSO), 1-butanol (NBA), diacetone alcohol (DAA) and ethanol (EA) were added as organic solvents to obtain a coating liquid for silver film formation (Ag: 40%; DMSO: 2.5%; $H_2O$: 21.5%; EA: 21.0%; NBA: 5%; DAA: 10%). The fine silver particles in the coating liquid for silver film formation obtained had an average particle diameter of 50 nm and had such a uniform particle size distribution that granular fine silver particles of 35 to 65 nm in particle diameter held 90% or more of the whole. The coating liquid for silver film formation had a viscosity of 5 mPa·s.

Next, a substrate PET film (TETRON HLEW, available from Teijin Limited; thickness: 100 µm; a primer-treated product) was coated thereon with the above coating liquid for silver film formation by means of a wire bar of 1.0 mm in wire diameter, followed by heat treatment at 70° C. for 3 minutes and at 130° C. for 60 minutes both in the atmosphere to obtain an electro-conductive silver film.

The electro-conductive silver film obtained was 3.0 µm in layer thickness and 0.08 Ω/square in surface resistivity (24.0 µΩ·cm in terms of specific resistivity). As a result of observation on a scanning electron microscope, any crack (break without separation) was seen not to have occurred in the electro-conductive silver film. Adhesion between the electro-conductive silver film and the substrate film was evaluated by a cross-cut cellophane tape peel test (JIS K 5400) to find that it was as good as 100/100 (no peeling).

The viscosity of the coating liquid for silver film formation was measured with a vibratory viscometer VM-100-L, manufactured by Yamaichi Electronics Co., Ltd. The surface resistivity of the electro-conductive silver film was measured with a surface resistivity meter LORESTA AP (MCP-T400), manufactured by Mitstubishi Chemical Corporation. The layer thickness of the electro-conductive silver film was measured by observing film cross section on a transmission electron microscope (TEM).

EXAMPLE 4

The same coating liquid for silver film formation as that in Example 3 was used to form an electro-conductive silver film in the same way as in Example 3 except that, after the substrate was likewise coated, heat treatment was carried out at 80° C. for 180 minutes in the atmosphere. This electro-conductive silver film was 3.0 µm in layer thickness and 0.09 Ω/square in surface resistivity (27 µΩ·cm in terms of specific resistivity).

As a result of observation on a scanning electron microscope (SEM), any crack (break without separation) was seen not to have occurred in the electro-conductive silver film. Adhesion between the electro-conductive silver film and the substrate film was evaluated by a cross-cut cellophane tape peel test (JIS K 5400) to find that it was as good as 100/100 (no peeling).

EXAMPLE 5

The same coating liquid for silver film formation as that in Example 3 was used to form an electro-conductive silver film in the same way as in Example 3 except that a polyimide film (UPILEX S, available from Ube Industries, Ltd.; thickness: 50 µm) was coated therewith on its gloss side by means of a wire bar of 1.0 mm in wire diameter, followed by heat treatment at 70° C. for 3 minutes and at 220° C. for 60 minutes both in the atmosphere.

This electro-conductive silver film was 3.2 µm in layer thickness and 0.04 Ω/square in surface resistivity (12.8 µΩ·cm in terms of specific resistivity). As a result of SEM observation, any crack (break without separation) was seen not to have occurred in the electro-conductive silver film. Adhesion between the electro-conductive silver film and the substrate film was evaluated by a cross-cut cellophane tape peel test (JIS K 5400) to find that it was as good as 100/100 (no peeling).

EXAMPLE 6

The same coating liquid for silver film formation as that in Example 3 was used to form an electro-conductive silver film in the same way as in Example 3 except that a polyimide film (KAPTON H, available from Du Pont-Toray Co., Ltd.; thickness: 25 µm) was coated therewith on its gloss side by means of a wire bar of 1.0 mm in wire diameter, followed by heat treatment at 70° C. for 3 minutes and at 220° C. for 60 minutes both in the atmosphere.

This electro-conductive silver film was 3.1 µm in layer thickness and 0.04 Ω/square in surface resistivity (12.4 µΩ·cm in terms of specific resistivity). As a result of SEM observation, any crack (break without separation) was seen not to have occurred in the electro-conductive silver film. Adhesion between the electro-conductive silver film and the substrate film was evaluated by a cross-cut cellophane tape peel test (JIS K 5400) to find that it was as good as 100/100 (no peeling).

COMPARATIVE EXAMPLE 1

In a mixed solution of 208 g of an aqueous 23.1% iron sulfate ($FeSO_4.7H_2O$) solution and 256 g of an aqueous 37.5% sodium citrate [$C_3H_4(OH)(COONa)_3.2H_2O$] solution, 176 g of an aqueous 9.1% silver nitrate ($AgNO_3$) solution was mixed to allow them to react to obtain a reaction fluid containing an agglomerate of fine silver particles. Here, the mixed solution of an aqueous iron sulfate solution and an aqueous sodium citrate solution and the aqueous silver nitrate solution were set at liquid temperatures of 20° C. and 10° C., respectively.

The reaction fluid obtained was not subjected to any step of ripening by leaving, and the agglomerate of fine silver particles was filtered out by means of a centrifugal separator to obtain a cake of the agglomerate of fine silver particles. Thereafter, pure water was added to this cake to carry out washing-out to obtain 1,050 g of a fine silver particle colloidal dispersion (Ag: 0.75%). The fine silver particles in this fine silver particle colloidal dispersion were composed of granular fine silver particles of 2 to 10 nm in particle diameter, and had an average particle diameter of 7 nm.

COMPARATIVE EXAMPLE 2

The fine silver particle colloidal dispersion obtained in Comparative Example 1 was put into in an incubator kept at 25° C., and was left for 2 months. Thereafter, the fine silver particle colloidal dispersion was observed on a transmission electron microscope, where coarse silver particles in the form of triangular or hexagonal plates of 20 to 150 nm in particle diameter were seen to have come about mixedly with granular fine silver particles of 2 to 10 nm in particle diameter.

COMPARATIVE EXAMPLE 3

The fine silver particle colloidal dispersion (Ag: 0.75%) obtained in Comparative Example 1 was concentrated and washed both by ultrafiltration to obtain a concentrated and washed fine silver particle colloidal dispersion (Ag: 40%; the balance:water). The water serving as a solvent in this concentrated and washed fine silver particle colloidal dispersion had an electro-conductivity of 190 μS/cm as the value found by measuring that of the filtrate of the ultrafiltration.

To the concentrated and washed fine silver particle colloidal dispersion, dimethyl sulfoxide (DMSO), 1-butanol (NBA), diacetone alcohol (DAA) and ethanol (EA) were added to obtain a coating liquid for silver film formation (Ag: 10%; DMSO: 2.5%; $H_2O$: 15%; EA: 48.5%; NBA: 8%; DAA: 16%). The fine silver particles in the coating liquid for silver film formation obtained were composed of granular fine silver particles of 2 to 10 nm in particle diameter, and had an average particle diameter of 7 nm. The coating liquid for silver film formation had a viscosity of 4 mPa·s.

Next, a PET film (thickness: 100 μm; a primer-treated product) was coated thereon in the same way as in Example 3, with the above coating liquid for silver film formation by means of a wire bar of 1.0 mm in wire diameter, followed by heat treatment at 70° C. for 3 minutes and at 130° C. for 60 minutes both in the atmosphere to obtain an electro-conductive silver film.

This electro-conductive silver film was 0.8 μm in layer thickness, but cracks (breaks without separation) were visually seen to have occurred in the electro-conductive silver film over its whole areas, and were $1\times10^6$ Ω/square or more in surface resistivity. Adhesion between the electro-conductive silver film and the substrate film was evaluated by a cross-cut cellophane tape peel test (JIS K 5400) to find that it was 0/100, showing that all came off.

From the results of the above Examples 1 and 2 and Comparative Example 1, it is seen that, in Comparative Example 1 according to a conventional method making use of the Carey-Lea process the fine silver particles have an average particle diameter of 7 nm, whereas, in these Examples according to the process of the present invention, fine silver particle colloidal dispersions in which the granular fine silver particles having an average particle diameter of more than 30 nm stand dispersed are very simply obtainable. In Comparative Example 2, the reaction fluid is not left and ripened, but, after a colloidal dispersion has been made up, the colloidal dispersion is left and ripened, and hence coarse silver particles in the form of triangular or hexagonal plates of 20 to 150 nm in particle diameter which have undergone Ostwald growth have come about mixedly with granular fine silver particles of 2 to 10 nm in particle diameter.

From the results of the above Examples 3 to 6 and Comparative Example 3, it is also seen that, in the electro-conductive silver film of Comparative Example 3, making use of the coating liquid for silver film formation composed of fine silver particles of 7 nm in average particle diameter according to a conventional process, cracks (breaks without separation) occur over its whole areas even though it is as small as 0.8 μm in layer thickness, whereas, in these Examples according to the present invention, coating liquids for silver film formation are used in which the granular fine silver particles having an average particle diameter of more than 30 nm stand dispersed, and hence no crack (break without separation) occurs in the films even though they are as large as 3.0 to 3.2 μm in layer thickness, thus electro-conductive silver films with superior electro-conductivity are obtainable.

From the results of the above Example 4, it is still also seen that, in the case of the coating liquid for silver film formation of the present invention, the electro-conductive silver film with a superior electro-conductivity of 0.09 Ω/square in surface resistivity is obtainable even though the heat treatment temperature after coating is as low as 80° C.

POSSIBILITY OF INDUSTRIAL APPLICATION

As described above, the fine silver particles contained in the coating liquid for silver film formation according to the present invention have an average particle diameter of as large as from 20 to 200 nm, and hence the range of layer thickness within which films can be formed by coating making use of the coating liquid for silver film formation can be made broader to enable control of film resistance values and so forth by controlling layer thickness, baking temperature and so forth. Accordingly, the silver film obtained has a possibility of being utilized in a vast range of uses such as electro-conductive silver films, antimicrobial silver films, visible light reflective films and metallic-gloss printed films.

The invention claimed is:

1. A process for producing a fine silver particle colloidal dispersion, which comprises:

a reaction step of allowing an aqueous silver nitrate solution to react with a mixed solution of an aqueous iron(II) sulfate solution and an aqueous sodium citrate solution to form an agglomerate of fine silver particles;

a ripening step of leaving the resultant reaction fluid containing the agglomerate of fine silver particles at a temperature of from 40° C. to 100° C. until the fine silver particles grow to an average diameter of from 20 nm to 200 nm thereby giving granular particles, to obtain an agglomerate of fine silver particles having grown to an average particle diameter of from 20 nm to 200 nm thereby giving granular particles;

a filtration step of filtering the agglomerate of fine silver particles having grown to an average particle diameter of from 20 nm to 200 nm thereby giving granular particles, to obtain a cake of the agglomerate of fine silver particles; and a dispersion step of adding pure water to the cake to obtain the colloidal dispersion of the fine silver particles having an average particle diameter of from 20 to 200 nm.

2. A process for producing a coating liquid for silver film formation, which comprises:

a concentration and washing step of concentrating and washing the colloidal dispersion of the fine silver particles having an average particle diameter of from 20 to 200 nm obtained according to claim 1 to obtain a concentrated and washed fine silver particle colloidal dispersion; and a solvent mixing step of adding an organic solvent to the concentrated and washed fine silver particle colloidal dispersion.

3. The process for producing a coating liquid for silver film formation according to claim 2, wherein the organic solvent comprises dimethyl sulfoxide.

4. The process for producing a coating liquid for silver film formation according to claim 2, wherein, the concentration and washing step is performed such that the filtrate from ultrafiltration of the concentrated and washed fine silver particle colloidal dispersion has an electro-conductivity of 500 µS/cm or less.

5. The process for producing a coating liquid for silver film formation according to claim 2, wherein the fine silver particles in the coating liquid for silver film formation are in a concentration of from 10% by weight to 70% by weight.

* * * * *